United States Patent
Ta

(10) Patent No.: US 10,941,270 B2
(45) Date of Patent: Mar. 9, 2021

(54) BIODEGRADATION OF POLYMER USING SURFACE CHEMISTRY

(71) Applicant: John Nguyen Ta, Auburn, MA (US)

(72) Inventor: John Nguyen Ta, Auburn, MA (US)

( * ) Notice: Subject to any disclaimer, the term of this patent is extended or adjusted under 35 U.S.C. 154(b) by 2 days.

(21) Appl. No.: 16/295,694

(22) Filed: Mar. 7, 2019

(65) Prior Publication Data

US 2019/0276632 A1    Sep. 12, 2019

Related U.S. Application Data

(60) Provisional application No. 62/640,797, filed on Mar. 9, 2018.

(51) Int. Cl.
| | | |
|---|---|---|
| *C08J 11/10* | (2006.01) | |
| *C08J 11/28* | (2006.01) | |
| *C08K 5/544* | (2006.01) | |

(52) U.S. Cl.
CPC .............. *C08J 11/105* (2013.01); *C08J 11/28* (2013.01); *C08J 2367/04* (2013.01); *C08J 2383/04* (2013.01); *C08K 5/544* (2013.01)

(58) Field of Classification Search
USPC .......................................................... 521/48
See application file for complete search history.

(56) References Cited

U.S. PATENT DOCUMENTS

| | | | |
|---|---|---|---|
| 7,057,000 B2 | 6/2006 | Roesler et al. | |
| 7,914,897 B2 | 3/2011 | Zimmermann et al. | |
| 7,943,234 B2 | 5/2011 | Lawin et al. | |
| 8,097,269 B2 | 1/2012 | Pantelidis et al. | |
| 8,513,329 B2 | 8/2013 | Lake et al. | |
| 9,469,788 B2 | 10/2016 | Schuhmann et al. | |
| 2001/0034336 A1 | 10/2001 | Shah et al. | |
| 2003/0113766 A1 | 6/2003 | Pepper et al. | |
| 2004/0215313 A1 | 10/2004 | Cheng | |
| 2006/0147491 A1 | 7/2006 | DeWitt et al. | |
| 2006/0198868 A1 | 9/2006 | DeWitt et al. | |
| 2007/0071789 A1 | 3/2007 | Pantelidis et al. | |
| 2008/0171087 A1 | 7/2008 | Chappa et al. | |
| 2008/0268233 A1 | 10/2008 | Lawin et al. | |
| 2009/0318339 A1* | 12/2009 | Katzhendler | A61P 7/02 514/1.1 |
| 2010/0227158 A1 | 9/2010 | Clifford et al. | |
| 2011/0165808 A1 | 7/2011 | Zimmermann et al. | |
| 2014/0193889 A1 | 7/2014 | McDaniel | |
| 2015/0273061 A1 | 10/2015 | Trogler et al. | |

OTHER PUBLICATIONS

Arkles. "Silane coupling agents: connecting across boundaries." Morrisville: Gelest, 2003 (2003), 19 pages.
Cho, "What Happens to all that Plastic?," Jan. 31, 2012, retrieved Feb. 20, 2017, from URL: <http://blogs.ei.columbia.edu/2012/01/31/what-happens-to-all-that-plastic>.
Tuson et al., "Bacteria-surface interactions," Soft Matter, Mar. 4, 2013, 9(17):4368-80.
Zerehi, "Biodegradable plastics not breaking down in ocean, UN report says," Nov. 19, 2015, retrieved Oct. 23, 2016 from URL: <https://www.cbc.ca/news/canada/north/biodegradable-plastics-not-breaking-down-in-ocean-un-report-says-1.3325486>, The Canadian Broadcasting Corporation, 6 pages.

* cited by examiner

*Primary Examiner* — Terressa Boykin
(74) *Attorney, Agent, or Firm* — Fish & Richardson P.C.

(57) ABSTRACT

The present disclosure is related to methods of degrading of polymers using compounds of Formula I, which can make a hydrophilic surface on the polymer, and bacteria that degrade the polymer:

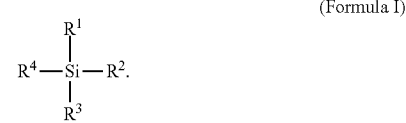

(Formula I)

8 Claims, 4 Drawing Sheets

BIODEGRADATION OF POLYMER USING SURFACE CHEMISTRY

CLAIM OF PRIORITY

This application claims the benefit of priority to U.S. Provisional Patent Application Ser. No. 62/640,797, filed on Mar. 9, 2018, the entire contents of which are hereby incorporated by reference.

TECHNICAL FIELD

The present disclosure is related to methods of degrading polymers using compounds that generate a hydrophilic surface on the polymer and bacteria that can degrade the polymers with the hydrophilic surface.

BACKGROUND

Plastics have proven to be one of the most important products in history. They are key to the economy and infrastructure of many countries and are used in almost every aspect of life. However, a major issue with almost all plastics is that they contribute significantly to waste buildup throughout the world. Some plastics may take up to 500 years to biodegrade. Americans alone produce and use about 33 million tons of plastic a year, and only recycle about two million tons of this waste. Furthermore, many existing methods that combat this issue of waste focus on improving the yield and efficiency of recycled plastics. There are few techniques that can combat the exorbitant amount of waste that is deposited into the environment each year. There remains a need to enhance the rate of degradation of plastics. This disclosure addresses these needs.

SUMMARY

This disclosure is related to methods of degrading a polymer comprising contacting the polymer with a compound that makes the surface of the polymer hydrophilic and then treating the contacted polymer with bacteria having an ability to degrade polymer. In one aspect, the compound is a compound comprising silicon having Formula I:

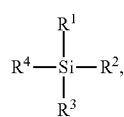

(Formula I)

or a salt thereof, where $R^1$, $R^2$, $R^3$, and $R^4$ are as defined herein.

DETAILED DESCRIPTION

Figure 1:
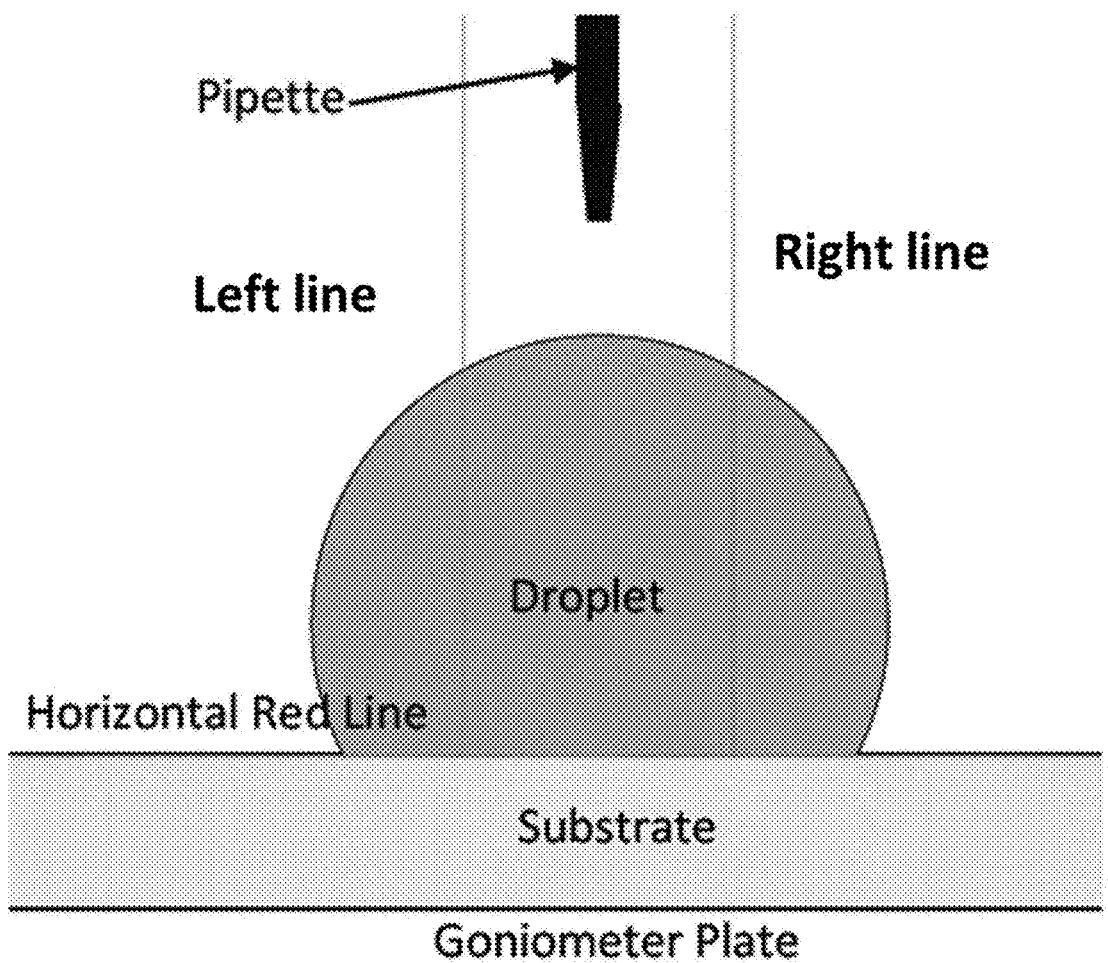
FIG. 1 is a diagram of what is displayed on the Ramé Hart Goniometer while taking down measurements of contact angles.

Silane chemistry is a branch of chemistry that utilizes alkoxysilanes and their functional groups to add various properties to a substrate through the use of surface bonding. Because of the wide variety of functional groups, there are many types of alkoxysilanes. For instance, the exposed methyl groups of dodecyl(trimethoxy)silane (DTMS) will give a hydrophilic substrate hydrophobic properties. Methyl groups possess hydrophobic properties because of their nonpolar nature, and due to their positioning on the substrate after surface bonding, polar molecules are unable to solvate the originally hydrophilic substrate. Furthermore, aminopropyldimethoxysilane (APDMS), which has amine groups, possesses hydrophilic properties because of the dipole moment between the nitrogen and bonded hydrogens, making the group polar. Due to the electronegativity differences between nitrogen and hydrogen, the two atoms are also able to participate in hydrogen bonding, facilitating their ability to be solvated by polar solvents. The properties suggest that APDMS can be surface bonded to a hydrophobic surface to make it hydrophilic. The hydrophilicity of APDMS can give the alkoxysilane the ability to attract bacteria and allow bacteria to adhere to a substrates' surface more easily and thus, can enhance the biodegradation of polymers (e.g., plastics) using bacteria.

Provided herein are methods of degrading a polymer that include contacting the polymer with a compound that can bond to the surface of the polymer (e.g., through covalent bond) and render the surface of the polymer hydrophilic in spite of original properties. Polymers that have compounds bonded to the surface are referred to herein as derivatized. The polymer that are surface derivatized are then treated with bacteria that can degrade polymer.

The compound that can bond to the surface of the polymer can include silicon, such as a compound of Formula I:

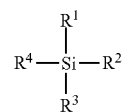

(Formula I)

or a salt thereof, wherein:

$R^1$ is selected from OH, O—($C_{1-6}$ alkyl), O—($C_{2-6}$ alkenyl) and O—($C_{2-6}$ alkynyl), wherein the O—($C_{1-6}$ alkyl), O—($C_{2-6}$ alkenyl), and O—($C_{2-6}$ alkynyl) are each optionally substituted with 1, 2, or 3 substituents selected from halo, OH, CN, $OR^a$, $SR^a$, $C(O)R^a$, $C(O)NR^aR^a$, $C(O)OR^a$, $OC(O)R^a$, $OC(O)NR^aR^a$, $NHR^a$, $NR^aR^a$, $NR^aC(O)R^a$, $NR^a$-$S(O)R^a$, $NR^aS(O)_2R^a$, $S(O)R^a$, $S(O)NR^aR^a$, $S(O)_2R^a$, $S(O)_2NR^aR^a$, and phenyl;

$R^2$ and $R^3$ are each independently selected from H, $C_{1-6}$ alkyl, $C_{2-6}$ alkenyl, $C_{2-6}$ alkynyl, OH, O—($C_{1-6}$ alkyl), O—($C_{2-6}$ alkenyl), O—($C_{2-6}$ alkynyl), and $C_{1-4}$ haloalkyl, wherein the $C_{1-6}$ alkyl, $C_{2-6}$ alkenyl, $C_{2-6}$ alkynyl, O—($C_{1-6}$ alkyl), O—($C_{2-6}$ alkenyl), and O—($C_{2-6}$ alkynyl) are each optionally substituted with 1, 2, or 3 substituents selected from halo, OH, CN, $OR^b$, $SR^b$, $C(O)R^b$, $C(O)NR^bR^b$, $C(O)OR^b$, $OC(O)R^b$, $OC(O)NR^bR^b$, $NHR^b$, $NR^bR^b$, $NR^bC(O)R^b$, $NR^bS(O)R^b$ $NR^bS(O)_2R^b$, $S(O)R^b$, $S(O)NR^bR^b$, $S(O)_2R^b$, $S(O)_2NR^bR^b$, and phenyl;

$R^4$ is selected from $C_{1-20}$ alkyl, $C_{2-20}$ alkenyl, and $C_{2-20}$ alkynyl, wherein the $C_{1-20}$ alkyl, $C_{2-20}$ alkenyl, and $C_{2-20}$ alkynyl are each substituted with 1, 2, or 3 substituents selected from halo, OH, CN, $OR^c$, $SR^c$, $C(O)R^c$, $C(O)NR^cR^c$, $C(O)OR^c$, $OC(O)R^c$, $OC(O)NR^cR^c$, $NHR^c$, $NR^cR^c$ $NR^cC(O)R^c$, $NR^cS(O)R^c$, $NR^cS(O)_2R^c$, $S(O)R^c$, $S(O)NR^cR^c$, $S(O)_2R^c$, and $S(O)_2NR^cR^c$; and each $R^a$, $R^b$, and $R^c$ is independently selected from H, $C_{1-6}$ alkyl, $C_{1-4}$ haloalkyl, $C_{2-6}$ alkenyl, and $C_{2-6}$ alkynyl.

In some examples, $R^1$ can be O—($C_{1-6}$ alkyl) optionally substituted with 1 or 2 substituents selected from halo, OH, $NH_2$, NH—$C_{1-6}$ alkyl, $N(C_{1-6}$ alky$)_2$, $C_{1-6}$ alkoxy, $C_{1-6}$ alkylthio, and phenyl. $R^1$ can be O—($C_{1-3}$ alkyl). For example, $R^1$ can be methoxy, ethoxy, and propoxy. $R^1$ can be methoxy.

In some examples, $R^2$ and $R^3$ can each be independently selected from $C_{1-6}$ alkyl, $C_{2-6}$ alkenyl, $C_{2-6}$ alkynyl, OH, O—($C_{1-6}$ alkyl), O—($C_{2-6}$ alkenyl), and O—($C_{2-6}$ alkynyl), wherein the $C_{1-6}$ alkyl, $C_{2-6}$ alkenyl, $C_{2-6}$ alkynyl, O—($C_{1-6}$ alkyl), O—($C_{2-6}$ alkenyl), and O—($C_{2-6}$ alkynyl) are each optionally substituted with 1 or 2 substituents selected from halo, OH, COOH, $NH_2$, NH—$C_{1-6}$ alkyl, and $N(C_{1-6}$ alky$)_2$.

In some examples, $R^2$ can be O—($C_{1-6}$ alkyl) optionally substituted with 1 or 2 substituents selected from halo, OH, $NH_2$, NH—$C_{1-6}$ alkyl, and $N(C_{1-6}$ alky$)_2$. In other examples, $R^2$ can be O—($C_{1-3}$ alkyl). Yet in some examples, $R^2$ can be methoxy.

In some examples, $R^3$ can be $C_{1-6}$ alkyl, $C_{2-6}$ alkenyl, or $C_{2-6}$ alkynyl. $R^3$ can be $C_{1-6}$ alkyl.

For example, $R^3$ can be methyl.

In some examples, $R^4$ can be selected from $C_{1-20}$ alkyl, $C_{2-20}$ alkenyl, and $C_{2-20}$ alkynyl, wherein the $C_{1-20}$ alkyl, $C_{2-20}$ alkenyl, and $C_{2-20}$ alkynyl are each optionally with 1, 2, or 3 substituents selected from halo, OH, $OR^c$, $C(O)R^c$, $C(O)NR^cR^c$, $C(O)OR^c$, $OC(O)R^c$, $OC(O)NR^cR^c$, $NHR^c$, $NR^cR^c$, and $NR^cC(O)R^c$. In other examples, $R^4$ can be $C_{1-20}$ alkyl substituted with 1 or 2 substituents selected from $NH_2$, NH—$C_{1-6}$ alkyl, and $N(C_{1-6}$ alky$)_2$. For example, $R^4$ can be $C_{1-10}$ alkyl substituted with 1 or 2 $NH_2$.

In some examples, the compound is:

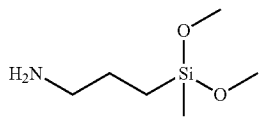

or a salt thereof. The chemical name of this compound is aminopropyldimethoxysilane (APDMS), The polymers described in this disclosure include typical plastics that are biodegradable, e.g, capable of being degraded by microorganisms such as bacteria. Polymers made from biodegradable components are generally biodegradable. For example, starch-based plastics from corn, potato, or tapioca starch-based polymers can be biodegradable. The polymer described herein can include silicone rubber or aliphatic polyester. In some examples, the aliphatic polyester is polylactic acid (PLA). The polylactic acids described herein are derived from starchy sources and are thus biodegradable. The microorganisms that can degrade polylactic acid can be bacteria such as *Staphylococcus epidermidis*.

In some examples, the degradation of the polymer that has been contacted with a compound of Formula I is enhanced compared to the degradation of the polymer without contact with a compound of Formula I. Contacting the polymer with a compound of Formula I can generate a polymer comprising a surface that has an increased hydrophilicity than a polymer without contact with a compound of Formula I.

Typically, the ultimate tensile strength (UTS) of the polymer that has been contacted with a compound of Formula I is lower than the UTS of the polymer without contact with a compound of Formula I. For instance, the enhancement of the degradation of a polymer that has been treated with a compound of Formula I as compared with a polymer without treatment with a compound of Formula I can be measured by determining the UTS of these polymers. Further, the UTS value decreases as the length of time of the treatment with bacteria capable of degrading polymer increases. UTS is the maximum tensile stress (MPa), calculated using force (N) divided by area (cm$^2$). This value can be calculated through the Instron method (see Examples) as it stretches the material being tested. The shape, cross sectional area, and length of a sample is provided, and the Instron device calculates the force involved during the stretching. Using the force and area, the tensile stress was determined. The UTS is the maximum value of the tensile stress values.

In some examples, the UTS of the polymer that has been contacted with a compound of Formula I is about 5% to about 15% lower (e.g., about 5%, about 6%, about 7%, about 8%, about 9%, about 10%, about 11%, about 12%, about 13%, about 14%, and about 15% lower) than the UTS of the polymer without contact with a compound of Formula I after treatment with the bacteria for three days. In some examples, the UTS of the polymer that has been contacted with a compound of Formula I is about 5% to about 15% lower (e.g., about 5%, about 6%, about 7%, about 8%, about 9%, about 10%, about 11%, about 12%, about 13%, about 14%, and about 15% lower) than the UTS of the polymer without contact with a compound of Formula I after treatment with the bacteria for six days.

Certain features of the invention, which are described in separately, can also be provided in any combination. For example, it is contemplated as features described as separately of the compounds of Formula (I) can be combined in any suitable combination.

At various places in the present specification, certain features of the compounds are disclosed in groups or in ranges. It is intended that such a disclosure include each and every individual subcombination of the members of such groups and ranges. For example, the term "$C_{1-6}$ alkyl" is specifically intended to individually disclose methyl, ethyl, $C_3$ alkyl, $C_4$ alkyl, $C_5$ alkyl and $C_6$ alkyl.

The term "optionally substituted" means unsubstituted or substituted. The term "substituted" means that a hydrogen atom is removed and replaced by a substituent. Substituted refers to any level of substitution, e.g., mono-, di-, tri-, tetra- or penta-substitution, where such substitution is permitted.

The term "$C_{n-m}$" indicates a range which includes the endpoints, wherein n and m are integers and indicate the number of carbons.

The term "alkyl" refers to a saturated hydrocarbon group that may be straight-chained or branched. The term "$C_{n-m}$ alkyl", refers to an alkyl group having n to m carbon atoms. An alkyl group refers to an alkane with one C—H bond replaced by the point of attachment of the alkyl group to the remainder of the compound. The alkyl group can contain from 1 to 6 carbon atoms, from 1 to 4 carbon atoms, from 1 to 3 carbon atoms, or 1 to 2 carbon atoms. Examples of alkyl moieties include chemical groups such as methyl, ethyl, n-propyl, isopropyl, n-butyl, tert-butyl, isobutyl, sec-butyl, and the like.

The term "alkenyl" refers to a straight-chain or branched hydrocarbon group corresponding to an alkyl group having one or more double carbon-carbon bonds. An alkenyl group refers to an alkene with one C—H bond replaced by the point of attachment of the alkenyl group to the remainder of the compound. The term "$C_{n-m}$ alkenyl" refers to an alkenyl group having n to m carbons. The alkenyl group can contain 2 to 6, 2 to 4, or 2 to 3 carbon atoms. Example alkenyl groups include ethenyl, n-propenyl, isopropenyl, n-butenyl, sec-butenyl and the like.

The term "alkynyl" refers to a straight-chain or branched hydrocarbon group corresponding to an alkyl group having one or more triple carbon-carbon bonds. An alkynyl group refers to an alkyne with one C—H bond replaced by the point of attachment of the alkyl group to the remainder of the compound. The term "$C_{n-m}$ alkynyl" refers to an alkynyl group having n to m carbons. Example alkynyl groups include ethynyl, propyn-1-yl, propyn-2-yl and the like. The alkynyl moiety can contain 2 to 6, 2 to 4, or 2 to 3 carbon atoms.

The terms "halo" or "halogen" refer to fluoro, chloro, bromo and iodo. In some instances, "halo" refers to a halogen atom selected from F, Cl, or Br. In some examples, halo groups are F.

The term "haloalkyl" refers to an alkyl group in which one or more of the hydrogen atoms has been replaced by a halogen atom. The term "$C_{n-m}$ haloalkyl" refers to a $C_{n-m}$ alkyl group having n to m carbon atoms and from at least one up to $\{2(n \text{ to } m)+1\}$ halogen atoms, which may either be the same or different. The haloalkyl group can have 1 to 6 or 1 to 4 carbon atoms. Example haloalkyl groups include $CF_3$, $C_2F_5$, $CHF_2$, $CCl_3$, $CHCl_2$, $C_2Cl_5$ and the like.

The present disclosure also includes salts of the compounds described herein. The term "salts" refers to derivatives of the disclosed compounds wherein the parent compound is modified by converting an existing acid or base moiety to its salt form. Examples of salts include mineral or organic acid salts of basic residues such as amines; alkali or organic salts of acidic residues such as carboxylic acids; and the like. The salts can be synthesized from the parent compound which contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two.

The term "about" when used in connection with a numeric value or range of values indicate that the value or range of values may vary by 5%, 4%, 3%, 2%, 1%, 0.9%, 0.8%, 0.7%, 0.6%, 0.5%, 0.4%, 0.3%, 0.2% or 0.1%.

The invention will be described in greater detail by way of specific examples. The following examples are offered for illustrative purposes, and are not intended to limit the invention in any manner. Those of skill in the art will readily recognize a variety of non-critical parameters, which can be changed or modified to yield essentially the same results.

Example 1. Surface Derivatization

Biodegradable polymers were surface derivatized using three different types of alkoxysilanes: DTMS, propyl-trimethoxysilane (PTMS), and APDMS. Afterwards, the samples were tested in various ways to determine effects on their physical characteristics. The first two silanes, which are hydrophobic, were expected to slow the rate of biodegradation because of the ability of these silanes to make it difficult for bacteria to adhere to a surface-bacteria prefer hydrophilic surfaces to adhere. The remaining silane, APDMS, which is hydrophilic, should increase the rate of biodegradation through its capability to make it easier for bacteria to adhere to the substrate and its ability to attract bacteria.

Strips of the polylactic acid (PLA) material (RioRand™ 1.75 mm PLA Filament) were cut and placed in a sonicator bath containing anhydrous ethanol and sonicated for ten minutes. While the coils of PLA material were being sonicated, 50 mL of ethanol was poured into four 140 mL beakers. Fifty µL of butyl amine was measured using the micropipette and inserted into each of the beakers, where it was stirred in using the pipette tip. Next, 100 µL of APDMS, DTMS, and PTMS were poured into different beakers. The last beaker did not receive any alkoxysilane and was labeled S&S (submerged and sonicated) as the control. After the strips were sonicated, the specimens were pulled out one by one from the sonicator and rinsed top down using methanol. The residue was poured into a waste beaker as the strips were rinsed. After rinsing, the samples were dried off using pressurized nitrogen gas and then each was placed into a new differing beaker. The beakers, now each containing one silicone rubber coil, were covered with aluminum foil and placed on a rotator for two hours. After rotation, the coils were removed and were rinsed and dried once again. They were placed one by one into different petri dishes. All the petri dishes were opened and left in a fume hood for approximately thirty minutes. Then, one-centimeter-long strips were removed and placed in small petri dishes for later use in contact angle testing. The remaining samples were placed in petri dishes and sealed with parafilm for later use.

Example 2. Tensile Testing

Tensile strength can be measured using a luggage scale and clamps. The tensile strength of silicone rubber was determined before and after surface derivatization. Silicone rubber material's ends were folded inwards to form two loops that could fit a human index finger. Then, duct tape was used to seal and strengthen the loop. The length, width, and thickness of the specimen were measured and recorded. The rope winch was set up so that ropes went around the entirety of a bench. Then, the material was hooked on one end by the rope winch's hook and on the other end it was hooked by the luggage scale. The luggage scale was attached to the hook on the winch and the winch was cranked to provide load (force). Successful load was being applied if the bottom and top ropes were taut. Between cranks, the reading of the luggage scale at that moment and the total elongation was measured. This process was repeated until the material broke. If the specimen broke at any other location besides the center, the experiment was deemed a failure, and the results from that trial were disregarded.

Another method of measuring the tensile strength is using an Instron 5544 device. The Instron 5544 and the Bluehill 3 software were turned on, and the stress and strain were initially tared out. Then, the sample was loaded onto the clamp and tightened using a wrench. The force wheel that controlled the movement of the clamp was spun to turn the initial stress up to 10 MPa in order to tighten the sample inside the clamps. Then, the strain was tared to zero at that point and the length of the specimen was measured using a digital caliper. The length measurement was loaded onto Bluehill and then the test was started. Afterwards, the procedure was repeated multiple times until samples snap or break.

Table 1 below shows the maximum loads of rubber using the homemade method and Instron method.

TABLE 1

|  | Load at Break(N) | |
|---|---|---|
|  | Homemade | Instron |
| Average | 26.93 | 25.45 |
| STD | 3.03 | N/A |

The homemade tensile testing apparatus was verified using an Instron. Values obtained through the Instron were treated as the theoretical values. Rubber and silicone rubber samples were tensile tested using both devices and their ultimate tensile strengths or maximum loads were compared. The percent error of the ultimate tensile strength for silicone rubber was about 9.3%. The surface derivatized silicone rubber samples suggested that surface modification had increased the original substrates' maximum resistance to load, which allowed for a higher tensile strength.

Without being bound to a particular theory, it is believed that the surface derivatized silicone rubber samples had higher maximum stress values because of the formation of silicon-oxygen bonds on the surface of the samples. In order for an alkoxysilane to bond to the surface of a material, exposed hydroxyl groups must be present. Upon bonding, the silanes form a layer of silicon-oxygen bonds across, which are strong bonds found in materials such as glass. It is likely that the silicon-oxygen layer on the surface of the polymer is causing this increased resistance to stress.

Example 3. Contact Angle Goniometry

To assess the contact angles of water on the substrates, the PLA sample from Example 1 was tested on a goniometer. The water droplets are placed on the sample using the syringe/pipette tip.
The PLA sample was first laid out on the silver goniometer plate and aligned directly underneath the micropipette tip. Then, two drops of 4.00 µL water were dropped onto the surface of the PLA filament. After the water droplet settled, the horizontal red line on the computer was aligned between the bottom of the water droplet and the PLA surface. The vertical left and right lines on the computer were then adjusted so that they defined the left and right sides of the water droplet. The left and right angles formed between the substrate surface and the tangent lines to the water droplet were recorded as the static contact angles. See FIG. 1, which shows a model of the Ramé Hart Goniometer. The left and right lines were adjusted to define the left and right sides of the droplet and the horizontal red line was moved to define the split between the droplet and substrate.

The micropipette tip was moved down and inserted into the water droplet, where an additional 4.00 µL of water was added to the droplet, causing it to swell. The left and right vertical lines were readjusted to accommodate for the swelling water droplet and these contact angles, or the advancing contact angles, were measured. Afterwards, 7.00 µL of water was drained from the droplet, forming a water droplet that was in the receding state. The left and right vertical lines were then readjusted again and the receding angles were measured and recorded once again.

After all these angles were measured, the platter knob was rotated to move the goniometer plate, exposing a new part of the specimen for contact angle testing. The entire process was repeated two more times in order for the angles to be averaged: there was lots of deviation among these measured contact angles.

Table 2 shows the contact angle data that has been statistically tested. One way ANOVA tests were first performed and if the ANOVA was significant ($p<0.05$), then additional paired t-tests were performed.

TABLE 2

|  | T-Tests | | | | | |
|---|---|---|---|---|---|---|
|  | Static | | Advancing | | Receding | |
|  | Left | Right | Left | Right | Left | Right |
| ANOVA | 0.0000 | 0.5619 | 0.0033 | 0.3474 | 0.0000 | 0.0208 |
| Unmodified | 0.4013 | N/A | 0.2852 | N/A | 0.0866 | 0.238 |
| ETOH | 0.0401 | N/A | 0.0884 | N/A | 0.0568 | 0.2161 |
| PTMS | 0.0442 | N/A | 0.015 | N/A | 0.0119 | 0.4753 |
| DTMS | 0.4797 | N/A | 0.3915 | N/A | 0.5823 | 0.96 |
| APDMS | 0.3824 | N/A | 0.2516 | N/A | 0.0518 | 0.0115 |

Figure 5:
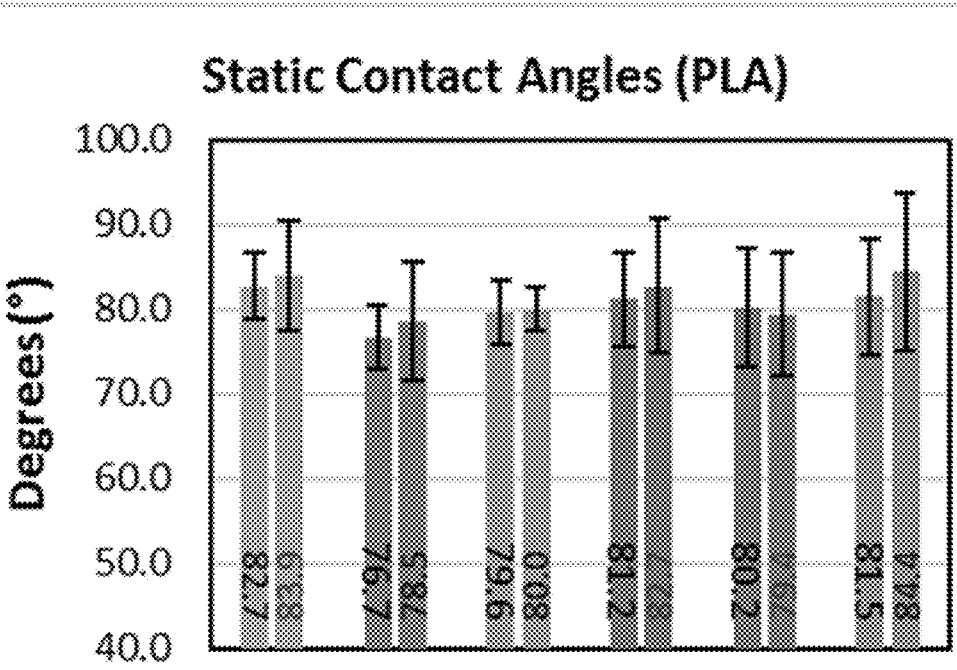
FIG. 5 is a graph of the static contact angles of polylactic acid (PLA) polymer, measured using the Ramé Hart Goniometer.
Figure 6:
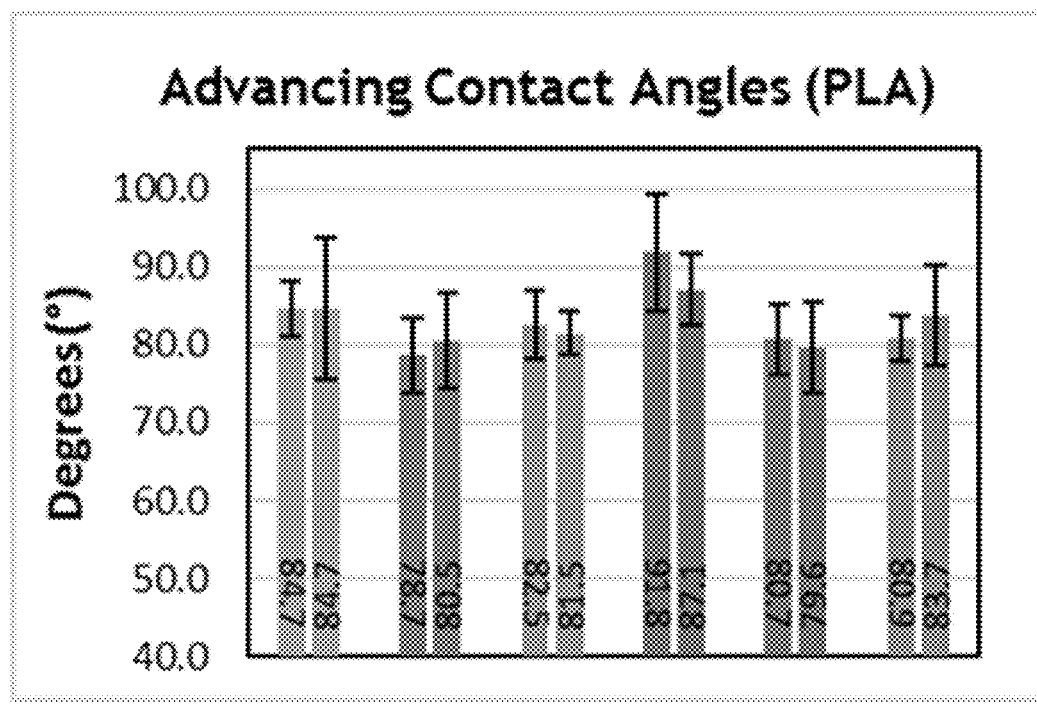
FIG. 6 is a graph of the advancing contact angles of polylactic acid (PLA) polymer, measured using the Ramé Hart Goniometer.
Figure 7:
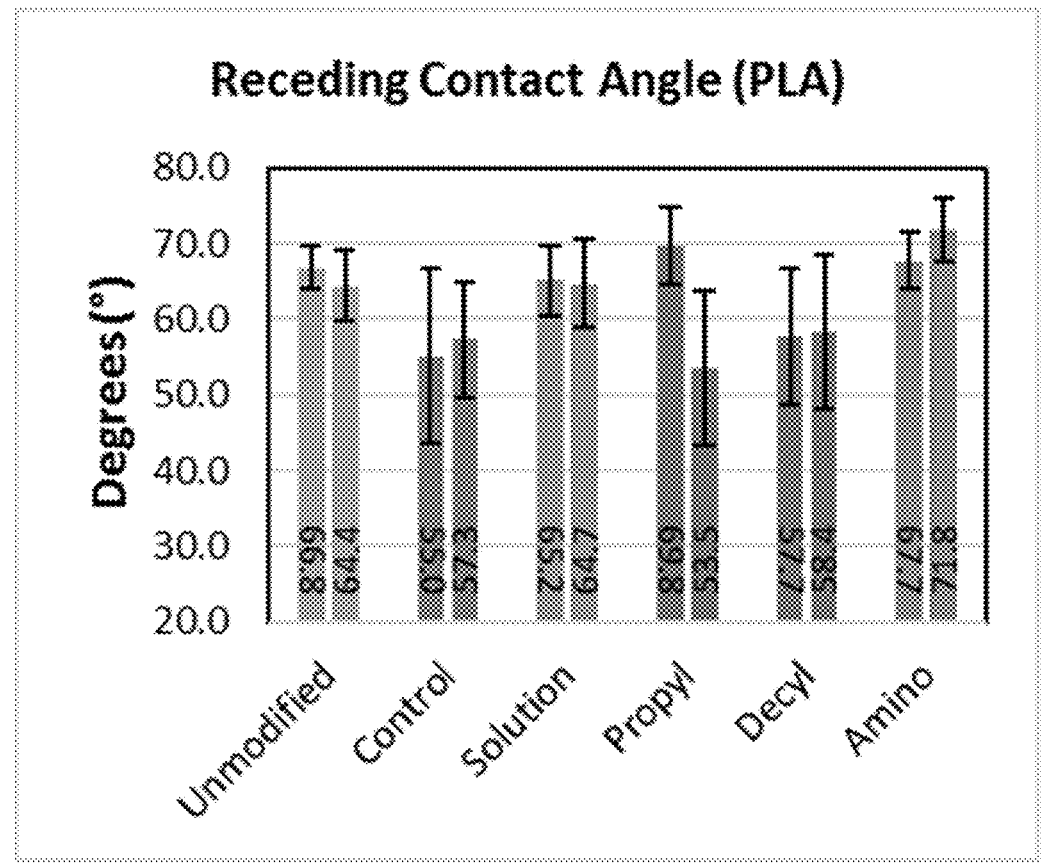
FIG. 7 is a graph of the receding contact angles of polylactic acid (PLA) polymer, measured using the Ramé Hart Goniometer.

The contact angle data obtained suggested that the polylactic acid samples had been successfully surface derivatized. FIGS. 5-7 show the graphs of the static, advancing, and receding contact angles of polylactic acid polymer, respectively.

Example 4. Bacterial Testing

Thirteen mL bacterial culture vials, forceps, samples of surface derivatized PLA, PLA, scissors, and broth medium were obtained and placed in the bacterial fume hood. The workspace and all items in the hood were sprayed with ethanol and wiped down to sanitize the work environment. The vials were each filled with 10 mL of broth medium using the micropipette and six samples with differing surface chemistries were obtained and placed into each vial. The micropipette tube was then placed back into its cover and thrown into the biohazard trash. *Staphylococcus epidermidis* was added to each vial and afterwards, the vials were capped and sealed with parafilm to prevent leakage. Then, everything in the hood was wiped down with 70% ethanol and each vial was transported to the vial rotator inside the 30° C. incubator. Rotator was turned on and the incubator door was closed. The materials left inside the fume hood were either removed and cleaned in the sink or were left in an orderly fashion for future use.
Replacing Medium The vials were removed from the rotator and brought into the bacterial fume hood. A pair of micropipette tubes, a micropipette, a beaker, broth medium, bleach, and parafilm were obtained and placed into the fume hood. Next, everything inside the fume hood was sprayed down and wiped using 70% ethanol. The micropipette was fitted with one of the micropipette tubes. One at a time, the vials were drained of 8 mL of medium. This waste fluid was placed in a waste beaker. Next, 100 mL of bleach was added to the waste beaker to kill the bacteria and the beaker was covered with parafilm. A new pipette was used to obtain 8 mL of fresh medium for each vial. Because the remaining 2 mL of old medium contained the *S. epidermidis*, the new medium was not inoculated. Afterwards, the vials were closed and resealed using parafilm. Everything the hood was sprayed with 70% ethanol. The vials were removed and placed back into the vial rotator inside the incubator. After two hours, the beaker containing the bleach was removed from the fume hood, diluted with water, and poured into the sink.

Removing Samples

The vials were obtained from the rotator and set down inside a vial rack in the bacterial fume hood. Scissors, forceps, a beaker, bleach, petri dishes, parafilm, micropipette tubes, and a micropipette were obtained and placed inside the fume hood. Everything in the hood was then completely sprayed and wiped down with 70% ethanol. Next, the micropipette was fitted with a tube and 8 mL of medium was drained from each vial. Then, the forceps were used to grasp and remove each specimen from inside the tube. The samples were lifted over the beaker and sprayed with distilled water in order to remove external bacteria. The desired specimens were placed in petri dishes and sprayed down with 70% ethanol and left to dry inside the hood. Once the samples dried, they were all sprayed with the ethanol again to ensure all bacteria had been killed. If the vials still had specimens, they were refilled with fresh medium using a new pipette tip, capped, wiped down with 70% ethanol, and placed back into the incubator. The remaining tools were wiped down using the 70% ethanol and the beaker was filled with 150 mL of bleach, labeled, and covered with parafilm. Once two hours had passed, the beaker was removed from the hood, diluted with water, and deposited into the sink.

Polylactic Acid (No Bacteria)

The polylactic acid samples demonstrated that over time, the bacteria were able to weaken the physical properties of the PLA. The samples that were surface modified were covered in a white layer of biofilm on removal from the vials.

The ANOVA and paired t-tests of the PLA samples suggested that they had been successfully surface derivatized. The negligible differences between the maximum stress values of the surface modified PLA samples and the unmodified PLA samples demonstrated that the alkoxysilanes did not have a major influence on the substrate's ability to resist stress. This deviation from the trend seen in the silicone rubber samples stems from the fact that PLA is much stronger than silicone rubber: PLA is capable of withstanding almost 30 times the stress of silicone rubber. Consequently, the silicon-oxygen bonds present on surface modified PLA will not have as much of an influence in comparison to the weaker silicone rubber samples.

Polylactic Acid (Bacteria)

Figure 2:
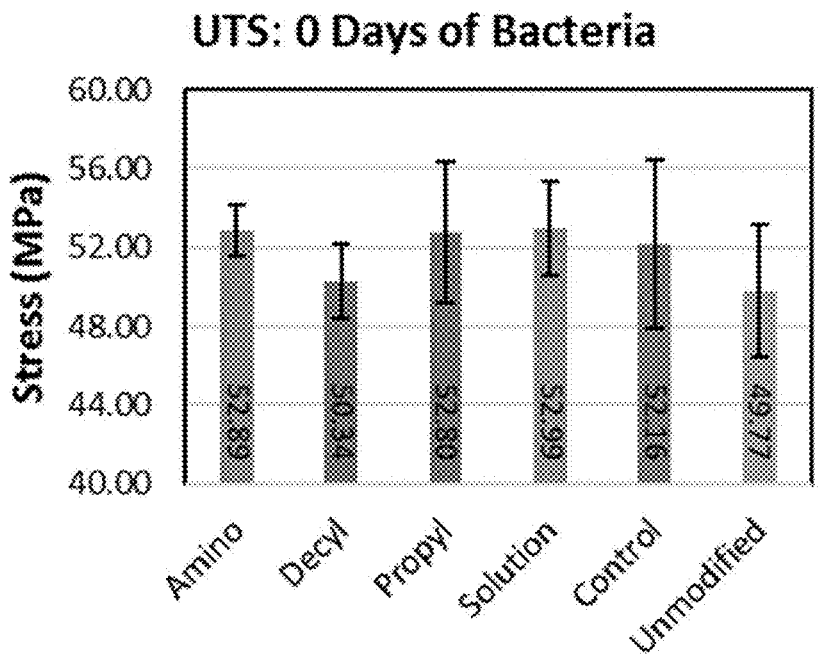
FIG. 2 is a graph of the ultimate tensile strength (UTS) values of the polymers that have not been in contact with bacteria.
Figure 3:
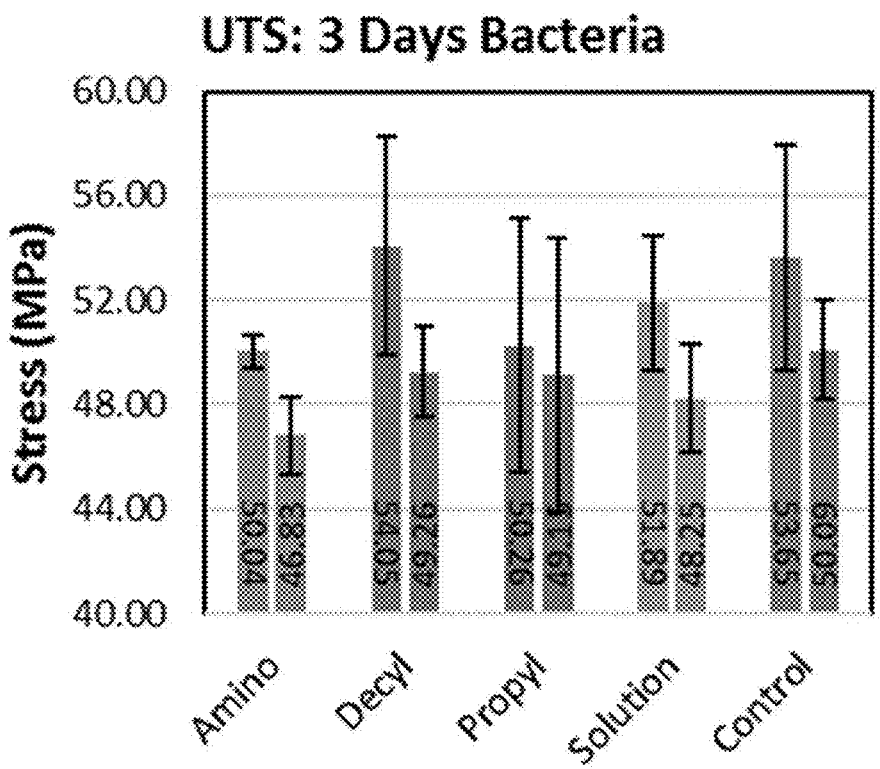
FIG. 3 is a graph of the UTS values of the polymers that have been contacted with bacteria for three days.
Figure 4:
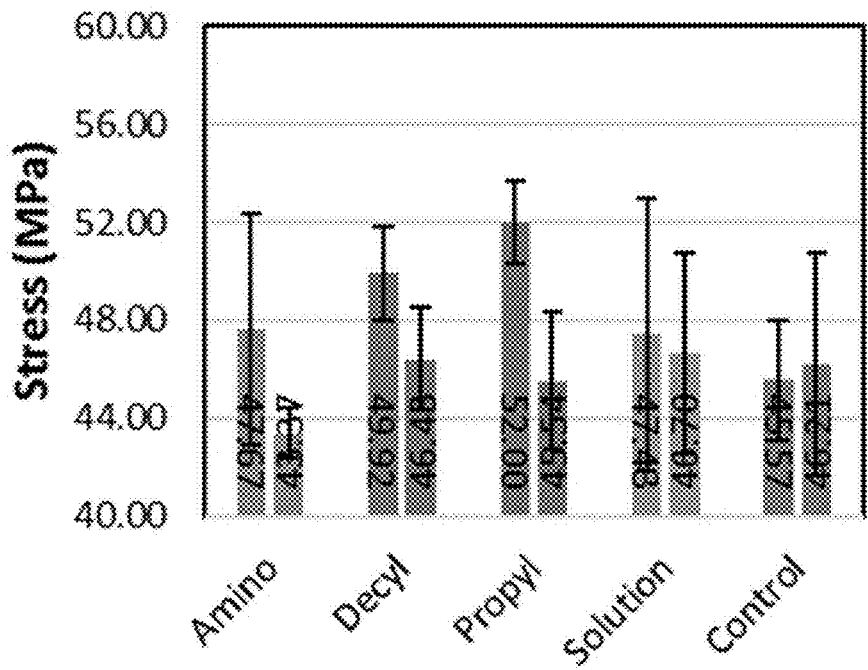
FIG. 4 is a graph of the UTS values of the polymers that have been contacted with bacteria for six days.

FIGS. 2-4 are graphs that show the UTS values of PLA that have been treated with APDMS (denoted as amino), DTMS (denoted as decyl), or PTMS (denoted as propyl), as compared to solution (sonicated only), control (sonicated and placed in ethanol and butyl amine bath without any addition of alkoxysilanes) and unmodified PLA (not modified and not sonicated). The samples of PLA that were surface derivatized with APDMS showed that the rate of biodegradation increased the fastest with this silane. This is because APDMS has an amine group at the end of its carbon chain, which gives it hydrophilic properties. Bacteria are easily able to adhere to hydrophilic surfaces, which allows surfaces with the APDMS silane to easily foster large colonies of bacteria. This ability to attract and hold bacteria is visually seen by the formation of biofilm on the samples with APDMS whereas the DTMS and PTMS samples did not possess biofilms visible to the naked eye.

Samples that were surface modified with DTMS or PTMS had large 95% confidence intervals. These error bars were greater than those of the APDMS's because of DTMS's and PTMS's ability to repel bacteria. Because of the high volume of bacteria in the testing vials, it is very difficult for these silanes to repel all the bacteria at once. As a result, one specimen could be degrading at a 60% rate whereas another could be degrading at a 45% rate. This inconsistency in the rate of biodegradation leads to large error bars in the ultimate tensile strength of the samples surface modified with DTMS or PTMS.

The frequent overlapping of the error bars in the ultimate tensile strength graph of the samples most likely derives from a few fixable errors. First, the length of time at which the samples were placed in the bacteria may not be long enough in order to see differences between the silanes. Future extensive testing with longer periods of time may be required. Second, the bar graphs all start at 40 MPa, which is about a 65% zoom from 0 MPa with respect to the max MPa in each graph (60 MPa). Consequently, the minute differences between the error bars are more likely to be seen because all the graphs are "zoomed in." Third, the differing type of alkoxysilanes on each of the samples affects the surrounding bacteria. For example, samples without alkoxysilanes should have no influence on the bacteria whereas DTMS and PTMS should repel them. Samples with no alkoxysilanes should have a comparable effect to samples surface modified with DTMS and PTMS because of the difficulty to repel all of the surrounding bacteria.

The surface derivatization of weak materials, such as silicone rubber, increases the material's ability to withstand higher amounts of stress. However, for stronger materials like polylactic acid, the material's initial strength is not significantly affected because the strength of the silicon-oxygen bonds is negligible in comparison to the strength of the substrate. Aminopropyldimethoxysilane can increase the rates at which materials biodegrade. By both attracting bacteria and making it easier for bacteria to adhere to a substrate surface, APDMS allows for an increased rate of biodegradation by facilitating bacterial adheration. Differently, PTMS and DTMS serve to reduce how fast these materials biodegrade by making it more difficult for bacteria to bind to the substrate.

Various modifications of the invention, in addition to those described herein, will be apparent to those skilled in the art from the foregoing description. Such modifications are also intended to fall within the scope of the appended claims. Each reference, including without limitation all patent, patent applications, and publications, cited in the present application is incorporated herein by reference in its entirety.

What is claimed is:

1. A method of degrading a polymer comprising:
   (i) contacting the polymer with compound:

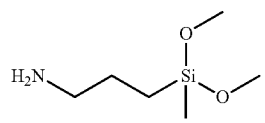

or a salt thereof,
   (ii) treating the polymer of (i) that has been contacted with the compound, or a salt thereof, with bacteria having an ability to degrade polymer.

2. The method of claim 1, wherein the polymer is silicone rubber or aliphatic polyester.

3. The method of claim 2, wherein the aliphatic polyester is polylactic acid (PLA).

4. The method of claim 1, wherein the bacteria is *Staphylococcus epidermidis*.

5. The method of claim 1, wherein the degradation of the polymer that has been contacted with the compound, or a salt thereof, is enhanced compared to the degradation of the polymer without contact with the compound or salt thereof.

6. The method of claim 1, wherein the contact of the polymer and the compound, or a salt thereof, generates a polymer comprising a surface having an increased hydrophilicity than a polymer without contact with the compound, or a salt thereof.

7. The method of claim 5, wherein the ultimate tensile strength (UTS) of the polymer that has been contacted with the compound, or a salt thereof, is lower than the UTS of the polymer without contact with the compound, or a salt thereof, after three days.

8. The method of claim 7, wherein the UTS of the polymer that has been contacted with the compound, or a salt thereof, is about 5% to about 15% lower than the UTS of the polymer without contact with the compound, or a salt thereof, after treatment with the bacteria for three days.

* * * * *